US010369692B2

(12) United States Patent
Nakanishi

(10) Patent No.: US 10,369,692 B2
(45) Date of Patent: Aug. 6, 2019

(54) ROBOT APPARATUS AND PARALLEL ROBOT

(71) Applicant: MITSUBA Corporation, Gunma (JP)

(72) Inventor: Hitoshi Nakanishi, Gunma (JP)

(73) Assignee: MITSUBA Corporation, Gunma (JP)

( * ) Notice: Subject to any disclaimer, the term of this patent is extended or adjusted under 35 U.S.C. 154(b) by 0 days.

(21) Appl. No.: 15/757,369

(22) PCT Filed: Oct. 11, 2016

(86) PCT No.: PCT/JP2016/080093
§ 371 (c)(1),
(2) Date: Mar. 5, 2018

(87) PCT Pub. No.: WO2017/065129
PCT Pub. Date: Apr. 20, 2017

(65) Prior Publication Data
US 2018/0236655 A1 Aug. 23, 2018

(30) Foreign Application Priority Data
Oct. 13, 2015 (JP) ................................. 2015-202048

(51) Int. Cl.
*B25J 9/10* (2006.01)
*F16C 35/06* (2006.01)
(Continued)

(52) U.S. Cl.
CPC .............. *B25J 9/102* (2013.01); *B25J 9/0051* (2013.01); *B25J 9/0063* (2013.01); *B25J 9/1065* (2013.01);
(Continued)

(58) Field of Classification Search
CPC ........ B25J 9/102; B25J 9/0051; B25J 9/1065; B25J 9/0063; B25J 9/0009; B25J 9/1623;
(Continued)

(56) References Cited

U.S. PATENT DOCUMENTS 4,365,488 A * 12/1982 Mochida ................... F16D 3/38
403/57
5,649,778 A * 7/1997 Lin ...................... B23Q 1/0027
403/31
(Continued)

FOREIGN PATENT DOCUMENTS

JP H11303966 11/1999
JP 2001121460 5/2001
(Continued)

OTHER PUBLICATIONS

"International Search Report (Form PCT/ISA/210) of PCT/JP2016/080093," dated Dec. 13, 2016, with English translation thereof, pp. 1-4.

*Primary Examiner* — William Kelleher
*Assistant Examiner* — Bobby Rushing, Jr.
(74) *Attorney, Agent, or Firm* — JCIPRNET

(57) ABSTRACT

A robot apparatus includes: a base plate; a rotation-driving motor provided on the base plate; a transmission mechanism that is provided on a bottom surface side of the base plate and to which a rotational force of the rotation-driving motor is transmitted; and a rotation-driving mechanism that is provided on the bottom surface side of the base plate and to which the rotational force of the rotation-driving motor is input via the transmission mechanism. A workpiece is rotated by the rotation-driving mechanism at an end of the rotation-driving mechanism opposite to the base plate.

7 Claims, 7 Drawing Sheets

(51) Int. Cl.
*B25J 9/16* (2006.01)
*B25J 9/00* (2006.01)
*B25J 9/12* (2006.01)
*F16D 3/41* (2006.01)
*F16D 3/38* (2006.01)
*F16C 19/54* (2006.01)

(52) U.S. Cl.
CPC ............. *B25J 9/126* (2013.01); *B25J 9/1623* (2013.01); *F16C 35/06* (2013.01); *F16D 3/385* (2013.01); *F16D 3/41* (2013.01); *B25J 9/0009* (2013.01); *F16C 19/54* (2013.01); *Y10S 901/25* (2013.01)

(58) Field of Classification Search
CPC .. F16C 11/02; F16C 11/06; F16C 3/32; F16C 3/38; F16C 3/40
USPC .............................................. 403/57, 74, 84
See application file for complete search history.

(56) References Cited

U.S. PATENT DOCUMENTS

| | | | | |
|---|---|---|---|---|
| 6,347,900 B1* | 2/2002 | Sadakata | ................ | B21D 28/32 29/558 |
| 6,350,201 B1* | 2/2002 | Sedlmeier | ................ | F16D 3/40 403/74 |
| 6,976,922 B2* | 12/2005 | Smith | ................ | F16D 3/38 464/128 |
| 7,802,939 B2* | 9/2010 | Bushey | ................ | B25J 17/0275 403/57 |
| 8,181,551 B2* | 5/2012 | Breu | ................ | B25J 17/0266 74/490.01 |
| 8,210,068 B2* | 7/2012 | Feng | ................ | B25J 17/0266 74/490.05 |
| 8,591,136 B2* | 11/2013 | Gasparini | ................ | B64C 27/14 244/60 |
| 2008/0108446 A1* | 5/2008 | Faude | ................ | F16D 3/385 464/136 |
| 2009/0060637 A1* | 3/2009 | Kawanabe | ................ | F16D 1/0864 403/57 |
| 2011/0097184 A1* | 4/2011 | Kinoshita | ................ | B25J 17/0266 414/589 |
| 2015/0166190 A1* | 6/2015 | Cassagne | ................ | B64D 27/26 403/57 |
| 2015/0343631 A1* | 12/2015 | Martinez-Esponda | ................ | B25J 9/0051 74/490.03 |
| 2016/0018045 A1* | 1/2016 | Blackburn | ................ | B25J 9/08 239/722 |

FOREIGN PATENT DOCUMENTS

| | | |
|---|---|---|
| JP | 2010173019 | 8/2010 |
| JP | 2011088262 | 5/2011 |
| JP | 2014039977 | 3/2014 |

* cited by examiner

ROBOT APPARATUS AND PARALLEL ROBOT

CROSS-REFERENCE TO RELATED APPLICATION

This application is a 371 application of the International PCT application serial no. PCT/JP2016/080093, filed on Oct. 11, 2016, which claims the priority benefit of Japan application no. 2015-202048, filed on Oct. 13, 2015. The entirety of each of the above-mentioned patent applications is hereby incorporated by reference herein and made a part of this specification.

FIELD OF THE INVENTION

The invention relates to a robot apparatus and a parallel robot.

Priority is claimed on Japanese Patent Application No. 2015-202048, filed Oct. 13, 2015, the content of which is incorporated herein by reference.

DESCRIPTION OF RELATED ART

In the related art, a parallel robot that is used to three-dimensionally transport a workpiece which is a component of a product and to assemble the product is known.

A parallel robot comprises a base portion (a base member), three link mechanisms that are arranged at equal intervals in a circumferential direction on a bottom surface of the base portion, three driving portions (link motor devices) that are disposed on the base portion and are separately connected to base ends of the three link mechanisms, and a movable portion that is disposed at tips of the three link mechanisms and are rotatably connected to the tips. The three link mechanisms are arranged at equal intervals in the circumferential direction and are arranged radially (in a trifurcate shape) when viewed in a direction normal to the base portion. A hand arm is provided in the movable portion, and a workpiece is grasped and transported by the hand arm.

A parallel robot including a rotation-driving mechanism (a rotary portion driving mechanism) that is disposed to be suspended between a base portion and a movable portion and is disposed on a center axis of the parallel robot is also known. A hand arm can be rotated about the center axis of the parallel robot by the rotation-driving mechanism and a direction of a workpiece can be changed.

The rotation-driving mechanism mainly comprises a rotation motor device, a reduction mechanism that reduces rotation of the rotation motor device and outputs the reduced rotation, a rotary member to which the rotation of the rotation motor device is transmitted via the reduction mechanism, a rod-shaped linear moving member that is rotatable integrally with the rotary member, and a universal joint that connects a bottom end of the linear moving member to a movable portion. The rotation motor device, the reduction mechanism, and the rotary member are arranged on the base portion for reasons of assembly, reasons of layout, and the like.

PRIOR ART LITERATURE

Patent Literature

[Patent Literature 1]
Japanese Patent Publication No. 2014-39977

SUMMARY OF THE INVENTION

Technical Problem

A rotary shaft of the rotation motor device, the reduction mechanism, and the rotary member engage with each other using gears to transmit a driving force. Since the rotary shaft of the rotation motor device, the reduction mechanism, and the rotary member are arranged on the base portion, relative positions of the rotation motor device, the reduction mechanism, and the rotary member need to be deviated from each other in an axial direction for the purpose of engagement of the gears. Accordingly, it is necessary to raise the rotation motor device from the base portion and there is a likelihood that a size in a height direction (an axial direction) of the parallel robot will increase by as much.

Therefore, one of the embodiments of the invention provides a robot apparatus and a parallel robot of which a size in a height direction can be set to be smaller and that can have a reduced size.

Solution to Problem

According to a first aspect of one of the embodiments of the invention, there is provided a robot apparatus including: a base portion; a motor portion that is disposed on the base portion; a transmission mechanism that is disposed on one surface of the base portion and to which a rotational force of the motor portion is transmitted; and a rotation-driving mechanism that is disposed on the one surface of the base portion and to which the rotational force of the motor portion is input via the transmission mechanism, wherein a workpiece is rotated by the rotation-driving mechanism at an end of the rotation-driving mechanism opposite to the base portion.

In this way, by arranging the transmission mechanism and the rotation-driving mechanism on the same surface (one surface) of the base portion, it is possible to reduce the number of components which are disposed on the other surface of the base portion. Accordingly, it is possible to minimize a protruding height of components toward the other surface of the base portion and thus to set a size in the height direction of the robot apparatus to be smaller.

By arranging the transmission mechanism and the rotation-driving mechanism on the same surface (one surface) of the base portion, it is possible to reduce a distance from the transmission mechanism to a workpiece, that is, a distance from the transmission mechanism to an end of the rotation-driving mechanism opposite to the base portion. Accordingly, it is possible to set the length of the rotation-driving mechanism to be smaller. As a result, it is possible to reduce a stress which is applied to a position at which the rotation-driving mechanism is supported, that is, a base of the rotation-driving mechanism or a position at which the rotation-driving mechanism is connected to another component (for example, the movable portion). Accordingly, it is possible to decrease a size of components and to decrease a size of the robot apparatus as a whole.

According to a second aspect of one of the embodiments of the invention, in the robot apparatus according to the first aspect of one of the embodiments of the invention, the motor portion is disposed on the other surface of the base portion, a through-hole through which a rotary shaft of the motor portion is inserted is formed in the base portion, and the rotary shaft and the transmission mechanism are connected via the through-hole.

In this way, even when the motor portion is disposed on the surface of the base portion opposite to the surface on which the transmission mechanism is disposed, it is possible to easily connect the motor portion and the transmission mechanism. It is not necessary to raise the motor portion from the other surface of the base portion and it is possible to set a size in a height direction of the robot apparatus to be smaller.

According to a third aspect of one of the embodiments of the invention, in the robot apparatus according to the second aspect of one of the embodiments of the invention, the transmission mechanism includes: a sub gear that is disposed on the rotary shaft of the motor portion; and a reduction portion that includes at least one gear to which rotation of the sub gear is transmitted and which reduces the rotation of the sub gear and outputs the reduced rotation, and the reduction portion and the motor portion are arranged such that a part of the reduction portion and a part of the motor portion overlap each other in a thickness direction of the base portion.

By employing this configuration, it is possible to set inter-axis distances between the rotary shaft of the motor portion and the gears of the reduction mechanism to be small. Accordingly, it is possible to save a space when disposing the motor portion and the reduction mechanism and to decrease a size of the robot apparatus.

According to a fourth aspect of one of the embodiments of the invention, in the robot apparatus according to any one of the first to third aspects of one of the embodiments of the invention, a universal joint portion that connects the rotation-driving mechanism to a connecting target object is provided at at least one end of both ends of the rotation-driving mechanism, the universal joint portion includes: a pair of connecting portions of which one is attached to an end of the rotation-driving mechanism and of which the other is attached to the connecting target object; an intermediate portion that is disposed between the pair of connecting portions; a position regulating pin that connects the pair of connecting portions to the intermediate portion; a rolling bearing that is disposed in one of the connecting portion and the intermediate portion and rotatably supports the position regulating pin; and a spacer that is disposed around the position regulating pin, is disposed between the rolling bearing and the other of the connecting portion and the intermediate portion, and comes in contact with an inner ring of the rolling bearing, each of the pair of connecting portions includes: a base that extends in a direction intersecting an extending direction of the rotation-driving mechanism; and a pair of extensions that extends in a direction in which the extensions face each other from both ends of the base, the bases are separately attached to the rotation-driving mechanism and the connecting target object, the position regulating pin includes: a pin body that is inserted into the rolling bearing; a flange portion that is disposed at one end of the pin body and comes in contact with the inner ring of the rolling bearing; and a fixing portion that is disposed at the other end of the pin body, and a fixing target portion that is lockable to the fixing portion is disposed in the other of the connecting portion and the intermediate portion.

By employing this configuration, it is possible to enlarge a movable range of a connecting area between the rotation-driving mechanism and the connecting target object. Accordingly, it is possible to provide a robot apparatus that has a small size and can transport a workpiece over a broad area.

According to a fifth aspect of one of the embodiments of the invention, in the robot apparatus according to the fourth aspect of one of the embodiments of the invention, the fixing portion and the fixing target portion are screws.

By employing this configuration, it is possible to easily replace one of the fixing portion and the fixing target portion. Accordingly, it is possible to provide a robot apparatus with excellent maintainability.

According to a sixth aspect of one of the embodiments of the invention, in the robot apparatus according to the fourth or fifth aspect of one of the embodiments of the invention, the spacer is a member that is separate from the position regulating pin, the connecting portion, and the intermediate portion.

By employing this configuration, it is possible to replace only the spacer in a situation in which the spacer has worn out or the like and to provide a robot apparatus with excellent maintainability.

According to a seventh aspect of one of the embodiments of the invention, there is provided a parallel robot including: the robot apparatus according to any one of the first to sixth aspects of one of the embodiments of the invention; three link mechanisms that are disposed on the other surface of the base portion; and a movable portion that is disposed at tips of the three link mechanisms and are rotatably connected to the three tips, wherein the rotation-driving mechanism is disposed to be suspended between the base portion and the movable portion.

By employing this configuration, it is possible to provide a parallel robot of which a size in the height direction can be set to be small and that can decrease in size.

According to an eighth aspect of one of the embodiments of the invention, the parallel robot according to the seventh aspect of one of the embodiments of the invention further includes three driving portions that are disposed on the one surface of the base portion and are separately connected to base ends of the three link mechanisms.

By employing this configuration, it is possible to secure a large empty space on the other surface side of the base portion. Accordingly, for example, a support member for providing the parallel robot can be easily attached to the base portion using the empty space. As a result, it is possible to provide a parallel robot that can achieve a decrease in size and can be easily installed.

Advantageous Effects of Invention

In the robot apparatus and the parallel robot, by arranging the transmission mechanism and the rotation-driving mechanism on the same surface (one surface) of a base portion, it is possible to reduce the number of components which are disposed on the other surface of the base portion. Accordingly, it is possible to minimize a protruding height of components toward the other surface of the base portion and thus to set a size in the height direction of the robot apparatus to be smaller.

By arranging the transmission mechanism and the rotation-driving mechanism on the same surface (one surface) of the base portion, it is possible to reduce a distance from the transmission mechanism to a workpiece, that is, a distance from the transmission mechanism to an end of the rotation-driving mechanism opposite to the base portion. Accordingly, it is possible to set the length of the rotation-driving mechanism to be smaller. As a result, it is possible to reduce a stress which is applied to a position at which the rotation-driving mechanism is supported, that is, a base of the rotation-driving mechanism or a position at which the rotation-driving mechanism is connected to another component (for example, the movable portion). Accordingly, it is possible to decrease a size of components and to decrease a size of the robot apparatus as a whole.

BRIEF DESCRIPTION OF THE DRAWINGS

FIG. 5 is a top view of the vicinity of a rotation-driving motor according to the embodiment of the invention, where the base plate is illustrated to be see-through.

DESCRIPTION OF THE EMBODIMENTS

An embodiment of the invention will be described below with reference to the accompanying drawings.
(Parallel Robot)

Figure 1:
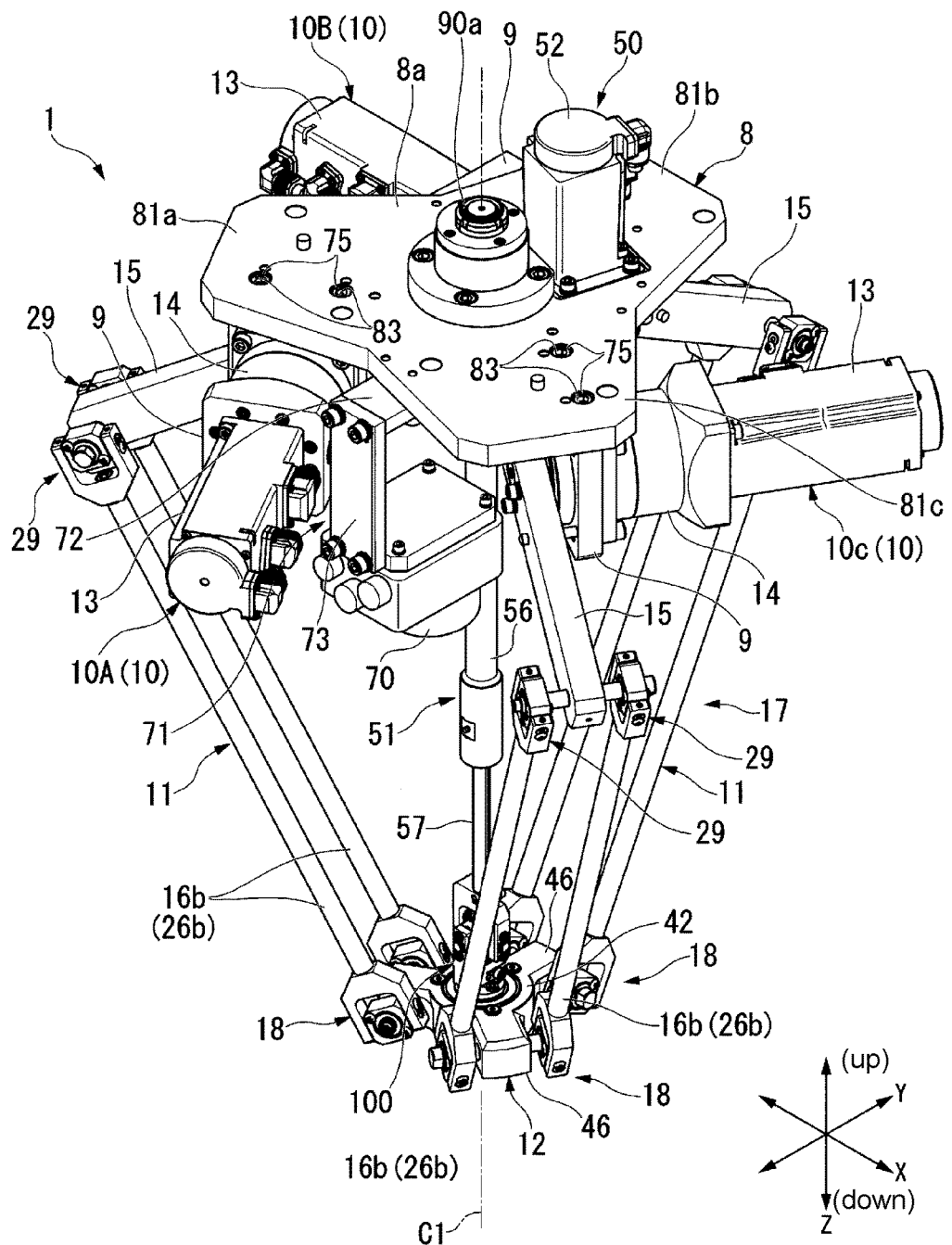
FIG. 1 is a perspective view of a parallel robot according to an embodiment of the invention when viewed obliquely from an upper side.
Figure 2:
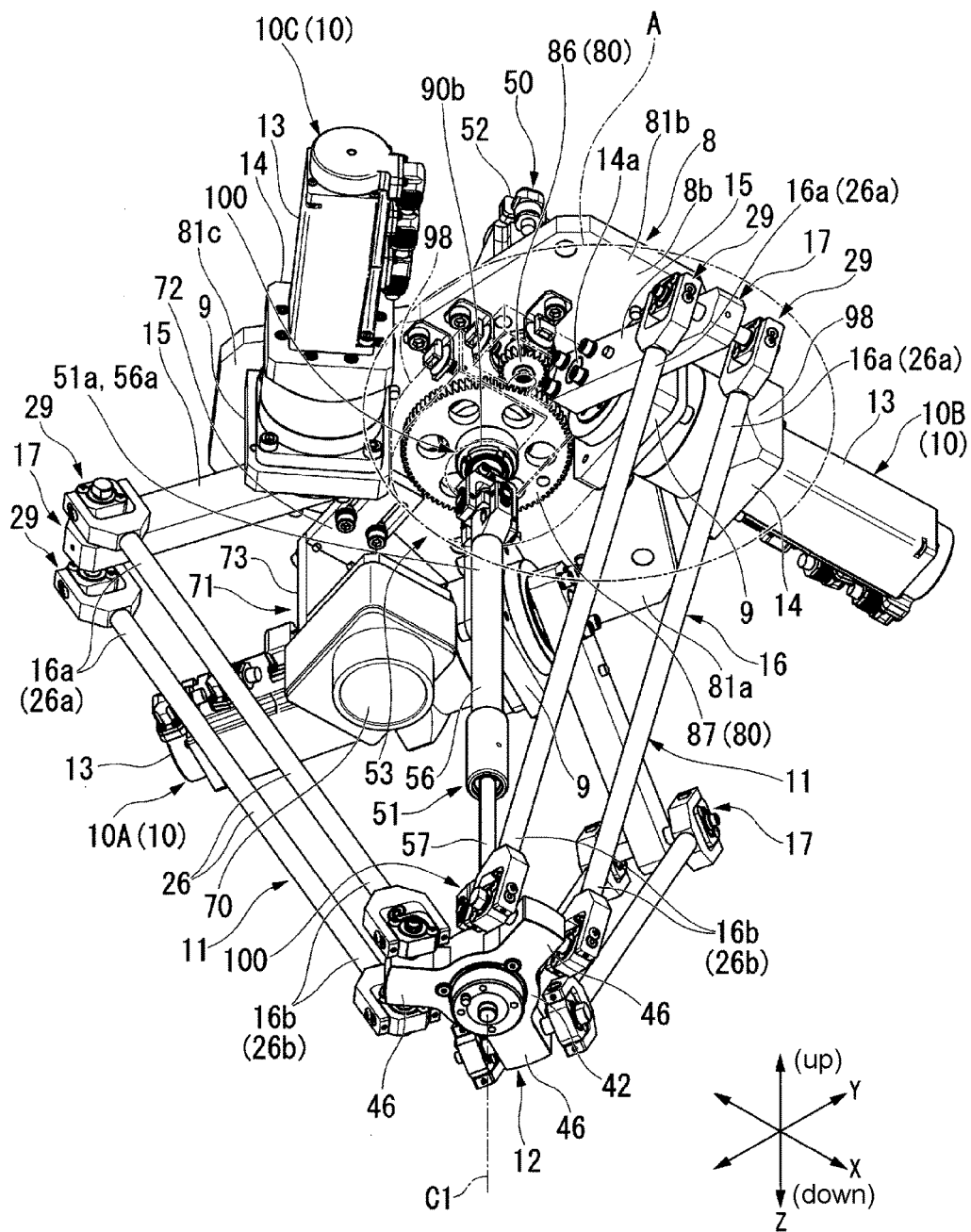
FIG. 2 is a perspective view of the parallel robot according to the embodiment of the invention when viewed obliquely from a lower side.

FIG. 1 is a perspective view of a parallel robot 1 when viewed obliquely from the upper side, and FIG. 2 is a perspective view of the parallel robot 1 when viewed obliquely from the lower side.

As illustrated in FIGS. 1 and 2, the parallel robot 1 is used to three-dimensionally transport a workpiece which is a component of a product and to assemble the product. The parallel robot 1 is attached to each of a plurality of sliders (not illustrated) which are disposed on a slide rail which is not illustrated in a slidable manner. The slide rail is arranged horizontally along a production line (an assembly line).

In the following description, a sliding direction (an alignment direction of the slide rail) of the parallel robot 1 is referred to as an X direction, a vertical direction is referred to as a Z direction, and a direction perpendicular to the X direction and the Z direction is referred to as a Y direction. In the following description, an upper side in the vertical direction (for example, an upper side in FIG. 1) in a state in which the parallel robot 1 is provided (a state in which the parallel robot is attached to the slide rail) is simply referred to as an upper side and a lower side in the vertical direction (for example, a lower side in FIG. 1) is simply referred to as a lower side.

The parallel robot 1 mainly includes a plate-shaped base plate 8 that is attached to the slider of the slide rail (none of which is illustrated), a rotation-driving motor 50 that is fixed to a top surface 8a of the base plate 8, a rotation-driving mechanism 51 that is connected to the rotation-driving motor 50, three lower reduction-gear motors 10 (10A to 10B) that are fixed to a bottom surface 8b of the base plate 8 via brackets 9, three link mechanisms 11 that are separately connected to the lower reduction-gear motors 10, and a movable plate 12 that is connected to the bottoms of the three link mechanisms 11 and the bottom of the rotation-driving mechanism 51.
(Base Plate)

Figure 3:
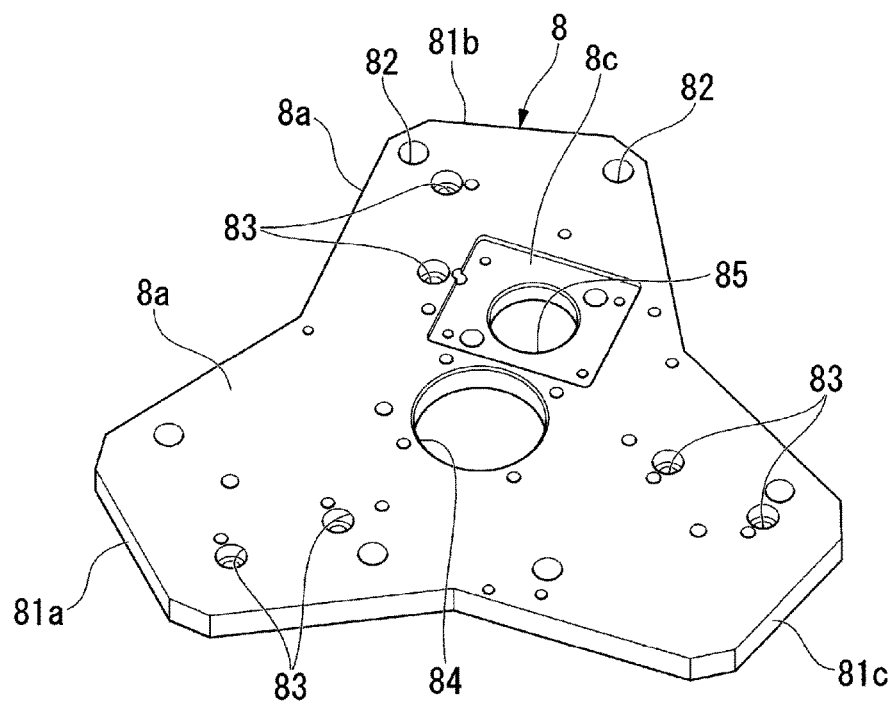
FIG. 3 is a perspective view of a base plate according to the embodiment of the invention when viewed from the upper side.
Figure 3:
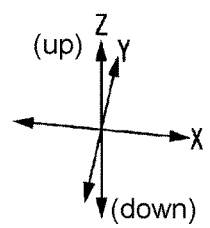

FIG. 3 is a perspective view of the base plate 8 when viewed from the top surface 8a side.

As illustrated in the drawing, the base plate 8 is formed such that an in-plane direction thereof is parallel to an XY plane. The base plate 8 is formed such that a planar shape when viewed from the top surface 8a is a substantially trifurcate shape. The base plate 8 includes three protruding portions 81a, 81b, and 81c that protrude along three XY planes. Bolt insertion holes 82 for fixing the base plate 8 to the slider of the slide rail (none of which is illustrated) are formed in one protruding portion 81b of the three protruding portions 81a to 81c. The base plate 8 is fastened and fixed to the slider by inserting bolts which are not illustrated into the bolt insertion holes 82 and screwing the bolts to the slider.

Bolt insertion holes 83 for fixing the bracket 9 are formed in each of the three protruding portions 81a to 81c of the base plate 8.

A first through-hole 84 is formed at the center in a diameter direction of the base plate 8, and a second through-hole 85 is formed adjacent to the first through-hole 84 (in the vicinity of the protruding portion 81b). The first through-hole 84 and the second through-hole 85 are used to attach the rotation-driving motor 50 to the base plate 8.
(Rotation-Driving Motor)

Figure 4:
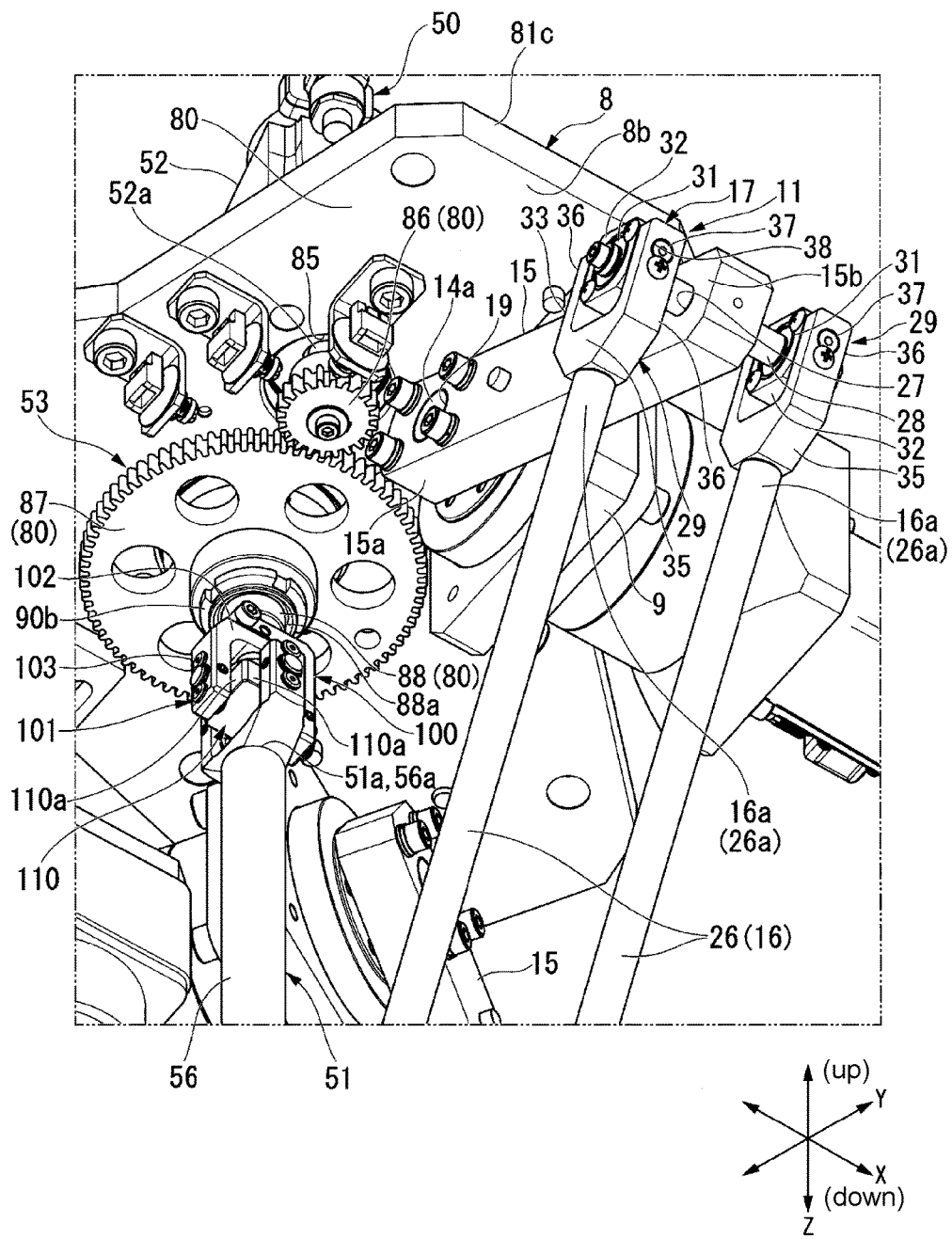
FIG. 4 is an enlarged view of FIG. 2.
Figure 5:
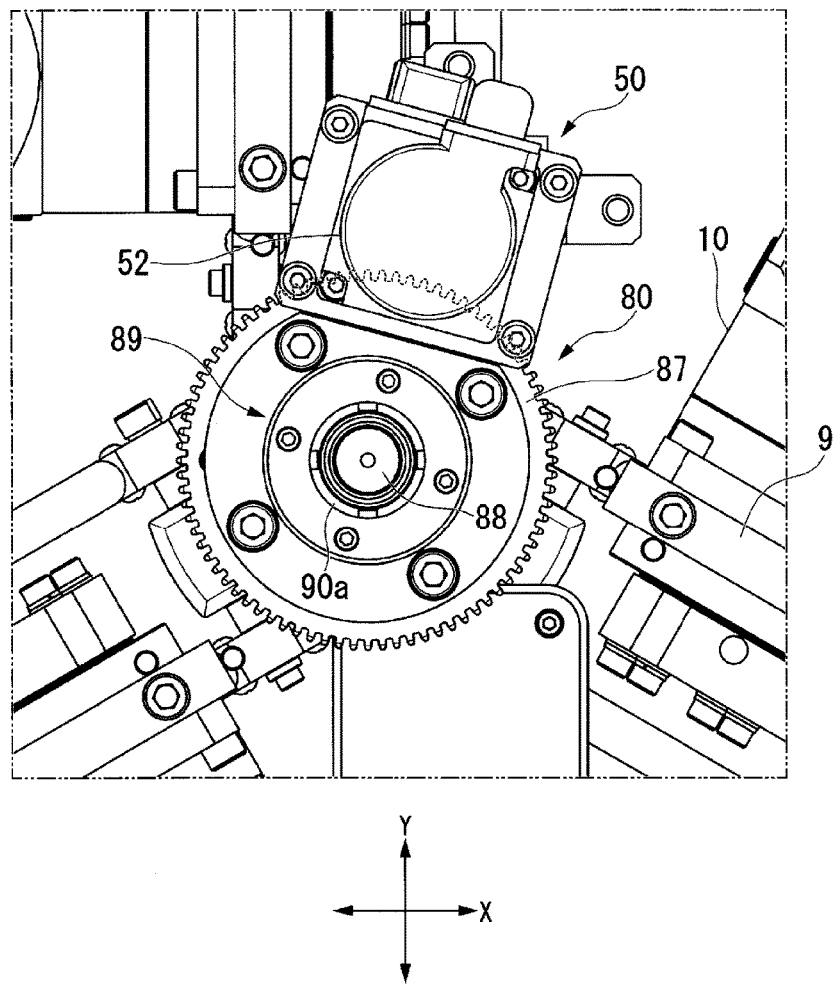

FIG. 4 is an enlarged view of FIG. 2, and FIG. 5 is a top view of the vicinity of the rotation-driving motor 50 of the parallel robot 1, where the base plate 8 is illustrated to be see-through.

As illustrated in FIGS. 1, 2, 4, and 5, the rotation-driving motor 50 serves to drive the rotation-driving mechanism 51. The rotation-driving motor 50 includes a motor portion 52 and a reduction portion 53 that reduces a rotational force of the motor portion 52 and outputs the reduced rotational force. The rotation-driving mechanism 51 is connected to the reduction portion 53.

The motor portion 52 is disposed on the top surface 8a of the base plate 8. A rotary shaft 52a thereof is inserted through the second through-hole 85. On the top surface 8a of the base plate 8, a recessed portion 8c that receives the motor portion 52 is formed at a position corresponding to the second through-hole 85.

The tip of the rotary shaft 52a protrudes from the bottom surface 8b of the base plate 8 via the second through-hole 85. A pinion gear 86 is attached to the protruding part. The reduction portion 53 is connected to the pinion gear 86.
(Reduction Portion, Transmission Mechanism)

The reduction portion 53 includes a spur gear 87 that engages with the pinion gear 86 and has a diameter larger than that of the pinion gear 86. The spur gear 87 is supported by a unified shaft 88. An upper end of the shaft 88 is rotatably supported by a bearing unit 89. The bearing unit 89 is disposed on the top surface 8a of the base plate 8 to close the first through-hole 84. The center of the first through-hole 84 and the axis of the shaft 88 are arranged coaxially. The bottom end of the shaft 88 is inserted through the spur gear 87.

Both ends of the shaft 88 protrude from the bearing unit 89 and the spur gear 87. Bearing nuts 90a and 90b are screwed to the protruding ends. Accordingly, movement of the spur gear 87 in the axial direction relative to the shaft 88 is restricted.

The pinion gear 86 and the reduction portion 53 (the shaft 88 and the spur gear 87) which are configured in this way constitute a transmission mechanism 80 that transmits rotation of the motor portion 52 to the rotation-driving mechanism 51. The transmission mechanism 80 is covered with a cover 98 indicated by a double dotted-dashed line in FIG. 2.

As illustrated in detail in FIG. 5, the motor portion 52 of the rotation-driving motor 50 and the spur gear 87 of the reduction portion 53 are arranged to partially overlap each other in a thickness direction (the Z direction) of the base plate 8.

In the following description, a rotation center of the shaft 88 (a rotation center of the spur gear 87) may be defined as C1 and the circumference of the rotation center C1 may be referred to as a circumferential direction.

(Joint Portion)

Figure 6:
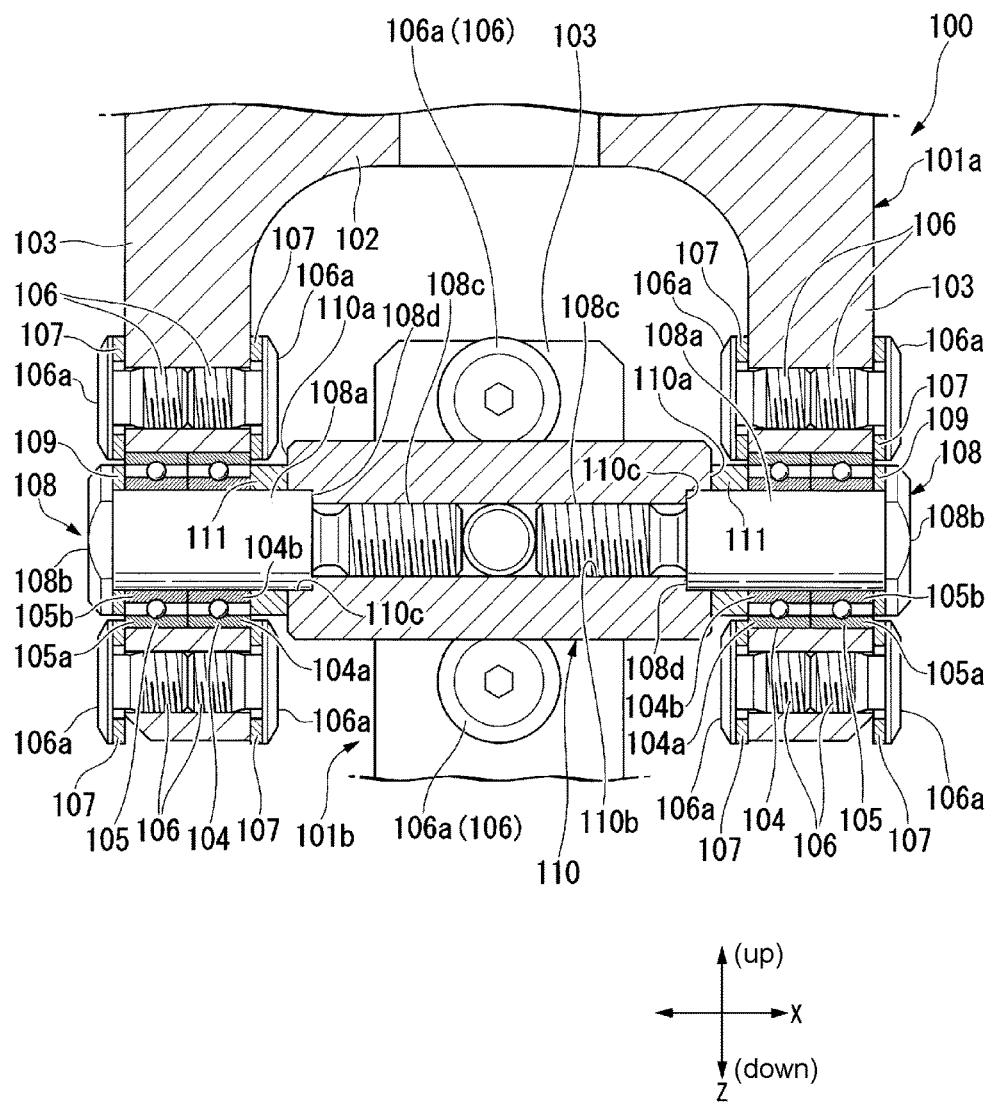
FIG. 6 is a longitudinal sectional view of a joint portion according to the embodiment of the invention.
Figure 7:
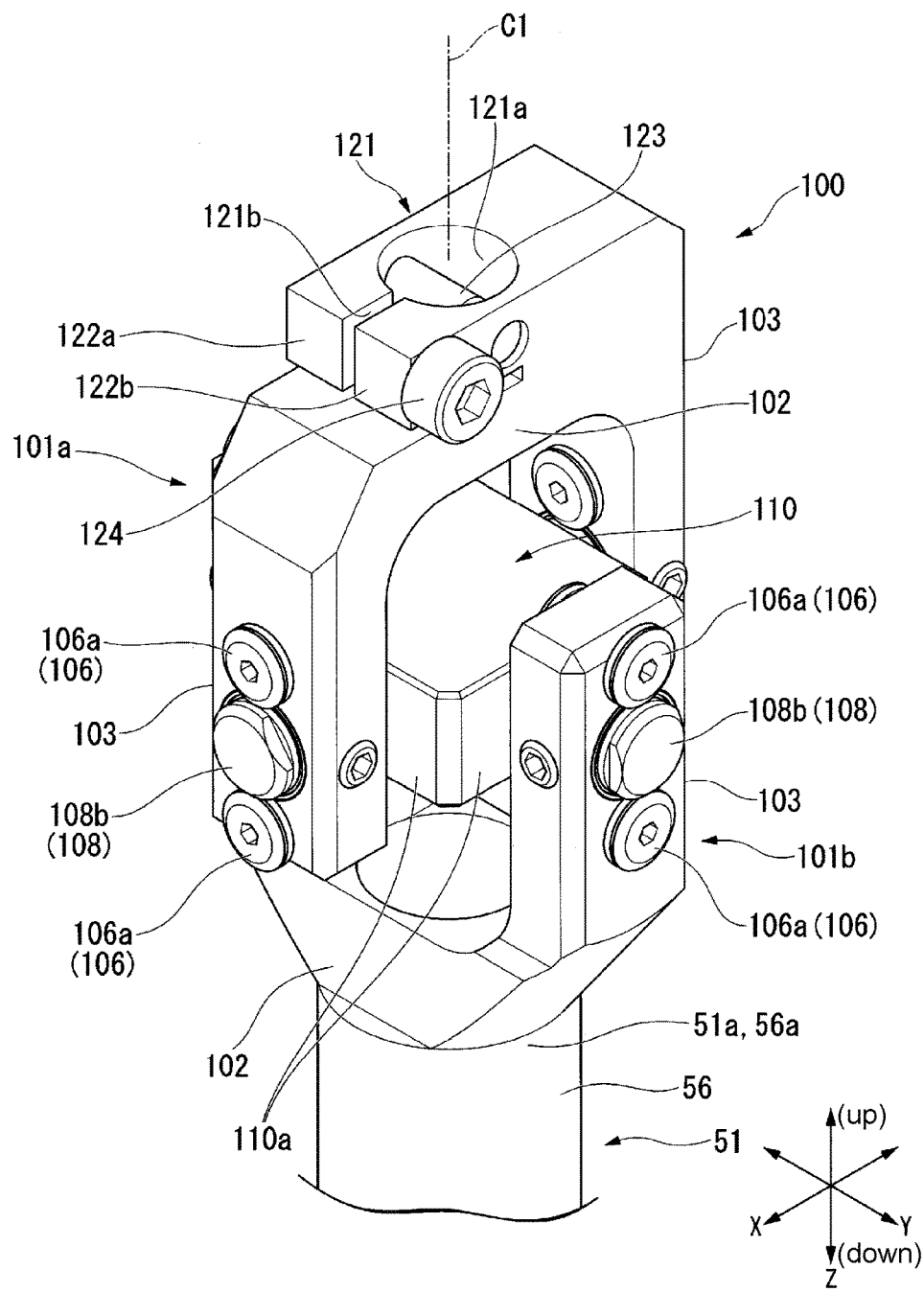
FIG. 7 is a perspective view of the joint portion according to the embodiment of the invention when viewed obliquely from the upper side.

FIG. 6 is a longitudinal sectional view of a joint portion 100 and FIG. 7 is a perspective view of the joint portion 100 when viewed obliquely from the upper side.

As illustrated in FIGS. 4, 6, and 7, the rotation-driving mechanism 51 is connected to a lower end 88a of the shaft 88 via the joint portion 100.

The joint portion 100 includes a pair of connecting portions 101a and 101b (a first connecting portion 101a and a second connecting portion 101b) which have a substantially C shape. The connecting portions 101a and 101b are disposed such that openings thereof face each other. In the pair of connecting portions 101a and 101b, a base end of the first connecting portion 101a is fixed to the lower end 88a of the shaft 88. A base end of the second connecting portion 101b is fixed to an upper end 51a of the rotation-driving mechanism 51.

Since the connecting portions 101a and 101b have the same basic configuration, only the same configuration of the first connecting portion 101a will be described, and portions of the second connecting portion 101b which are the same will be referenced by the same reference signs as in the first connecting portion 101a and description thereof will not be repeated. Differences in configuration between the first connecting portion 101a and the second connecting portion 101b will be described below.

The first connecting portion 101a is formed by integrally molding a base 102 of a substantially rectangular parallelepiped shape extending in a direction perpendicular to the extending direction of the shaft 88 from the lower end 88a of the shaft 88 and a pair of extensions 103 extending in a direction in which the extensions face each other from both ends in the length direction of the base 102. A fixing portion 121 that connects the base 102 to the lower end 88a of the shaft 88 is integrally molded into the base 102.

In the fixing portion 121, an insertion hole 121a through which the lower end 88a of the shaft 88 can be inserted is formed in the Z direction. A pin 123 extending in the Y direction is disposed in the fixing portion 121 to pass through the center of the insertion hole 121a.

At the lower end 88a of the shaft 88, a through-hole which is not illustrated and through which the pin 123 can be inserted is formed at a position corresponding to the pin 123. Accordingly, relative rotation of the fixing portion 121 and the lower end 88a of the shaft 88 inserted through the insertion hole 121a of the fixing portion 121 is restricted.

A slit 121b is formed in the X direction in the fixing portion 121. The slit 121b is formed from one end of the fixing portion 121 to the insertion hole 121a. Two tongue piece portions 122a and 122b are formed in the fixing portion 121 by the slit 121b. In the tongue piece portions 122a and 122b, an internally threaded portion which is not illustrated is inscribed in the Y direction at the tip of one tongue piece portion 122a. In the other tongue piece portion 122b, a bolt insertion hole (not illustrated) extending in the Y direction is formed at a position corresponding to the internally threaded portion which is not illustrated.

A bolt 124 is inserted into the bolt insertion hole and the bolt 124 is screwed into the internally threaded portion. When the bolt 124 is strongly fastened, the insertion hole 121a is deformed with a decrease in diameter. Accordingly, a fixing strength between the fixing portion 121 (the base 102 of the first connecting portion 101a) and the lower end 88a of the shaft 88 increases. It is possible to prevent rattling of the first connecting portion 101a with respect to the lower end 88a of the shaft 88. That is, the fixing portion 121 has a so-called slit-fastening fixing structure for fixing the first connecting portion 101a to the lower end 88a of the shaft 88.

On the other hand, a fixing portion 121 is not integrally molded into a base 102 of the second connecting portion 101b, but the base 102 is directly fixed to an upper end 51a of the rotation-driving mechanism 51. The base 102 of the second connecting portion 101b is formed in a substantially rectangular parallelepiped shape extending in a direction perpendicular to the extending direction of the rotation-driving mechanism 51.

Two rolling bearings 104 and 105 (a first rolling bearing 104 and a second rolling bearing 105) are provided in each extension 103. The two rolling bearings 104 and 105 are arranged coaxially in the thickness direction of the extension 103. That is, the first rolling bearing 104 is disposed on a side on which the extensions 103 forming a pair face each other (hereinafter also referred to as the inside of the extension 103). The second rolling bearing 105 is disposed on the outside of the pair of extensions 103 opposite to the inside. One side surface of each of the rolling bearings 104 and 105 is exposed from the extensions 103.

Stopper bolts 106 that presses outer rings 104a and 105a of the rolling bearings 104 and 105 are screwed to the extensions 103 on both sides in the thickness direction of each extension 103 and on both sides with the rolling bearings 104 and 105 interposed therebetween. A head portion 106a of each stopper bolt 106 presses the outer rings 104a and 105a of the rolling bearings 104 and 105 with a washer 107 interposed therebetween.

A position regulating pin 108 is inserted through each of the rolling bearings 104 and 105. The position regulating pin 108 includes a pin body 108a that is inserted through each of the rolling bearings 104 and 105, a flange portion (a head portion) 108b that is integrally molded into one end of the pin body 108a, and an externally threaded portion 108c that is integrally molded into the other end of the pin body 108a. The externally threaded portion 108c is formed to have a diameter smaller than that of the pin body 108a with a stepped portion 108d therebetween.

The position regulating pins 108 are inserted into the rolling bearings 104 and 105 from the second rolling bearing 105 side (the outside of the extension 103) of the two rolling bearings 104 and 105 in a state in which the externally threaded portions 108c of the position regulating pins 108 faces the second rolling bearing 105. In the state in which the position regulating pin 108 is inserted, the flange portion 108b presses an inner ring 105b of the second rolling bearing 105 with a washer 109 interposed therebetween.

The pair of connecting portions 101a and 101b having the above-mentioned configuration is arranged such that the bases 102 intersect each other in a cross shape when viewed in the Z direction (the axial direction). An intermediate piece 110 is disposed between the connecting portions 101a and 101b, that is, between four extensions 103.

The intermediate piece 110 is formed in a rectangular parallelepiped shape in which four side faces 110a have the same shape. The intermediate piece 110 is disposed such that the side faces 110a face the extensions 103. An internally threaded portion 110b is inscribed at the center of each side face 110a. The externally threaded portions 108c of the position regulating pins 108 are screwed into the internally threaded portions 110b.

On each side face 110a of the intermediate piece 110, a counterbored portion 110c is formed at a position corresponding to the internally threaded portion 110b. The stepped portion 108d of the position regulating pin 108 is inserted into the counterbored portion 110c and comes in contact therewith. Accordingly, a protruding distance of the position regulating pin 108 from the side face 110a of the intermediate piece 110 is determined.

In the pin body 108a of each position regulating pin 108, a spacer 111 is externally fitted between each extension 103 and the intermediate piece 110. The outer diameter of the spacer 111 is set to be slightly larger than the diameter of the inner rings 104b and 105b of the rolling bearings 104 and 105. Accordingly, an end face of the spacer 111 comes in contact with only the inner ring 104b out of the outer ring 104a and the inner ring 104b of the first rolling bearing 104 disposed inside each extension 103.

By configuring the joint portion 100 in this way, a pair of connecting portions 101 is connected to the intermediate piece 110 to be rotatable about the corresponding position regulating pins 108. Accordingly, it is possible to secure a relative moving range of the pair of connecting portions 101 as large as possible.

(Rotation-Driving Mechanism)

The rotation-driving mechanism 51 connected to the shaft 88 of the reduction portion 53 via the joint portion 100 includes a linear motion guide 56 of which an upper end 56a is fixed to the base 102 of the second connecting portion 101b and a rotary arm 57 that is connected to the linear motion guide 56 in a slidable manner and in a relatively non-rotatable manner.

The linear motion guide 56 is formed in a cylindrical shape. A spline which is not illustrated is formed on the inner circumferential surface of the linear motion guide 56. The rotary arm 57 is inserted into the linear motion guide 56 from the lower side.

A spline which is not illustrated is formed on the outer circumferential surface of the rotary arm 57 to correspond to the spline of the linear motion guide 56. That is, the linear motion guide 56 and the rotary arm 57 are spline-fitted to each other. Accordingly, rotation of the rotary arm 57 relative to the linear motion guide 56 is restricted and a telescopic motion of the rotary arm 57 relative to the linear motion guide 56 is possible. A movable plate 12 is connected to a lower end 57a of the rotary arm 57 via a joint portion 100.

The joint portion 100 disposed at the lower end 57a of the rotary arm 57 has the same basic configuration as the joint portion 100 fixed to the upper end 56a of the linear motion guide 56. Accordingly, description of the joint portion 100 disposed at the lower end 57a of the rotary arm 57 will not be repeated.

(Lower Reduction-Gear Motor)

On the other hand, as illustrated in FIGS. 1 and 2, three lower reduction-gear motors 10 which are disposed on the bottom surface 8b of the base plate 8 serve to separately drive three link mechanisms 11. The three lower reduction-gear motors 10 includes three lower reduction-gear motors 10A to 10C of a first lower reduction-gear motor 10A, a second lower reduction-gear motor 10B, and a third lower reduction-gear motor 10C.

Since the three lower reduction-gear motors 10A to 10C have the same configuration, the first lower reduction-gear motor 10A, the second lower reduction-gear motor 10B, and the third lower reduction-gear motor 10C are collectively referred to as a lower reduction-gear motor 10 in the following description unless particularly unnecessary.

The lower reduction-gear motor 10 includes a motor portion 13 and a reduction portion 14 that reduces a rotational force of the motor portion 13 and outputs the reduced rotational force. For example, a planetary gear reduction mechanism is used as the reduction portion 14.

A bracket 9 that supports the lower reduction-gear motor 10 having the above-mentioned configuration is formed in a substantially square plate shape. The bracket 9 rises downward in the Z direction from the bottom surface 8b of the base plate 8. Three brackets 9 are also provided to correspond to the number of lower reduction-gear motors 10. The brackets 9 are disposed to correspond to the bolt insertion holes 83 (see FIG. 3) formed in the base plate 8 and are arranged at equal intervals in the circumferential direction in a radial shape with respect to the rotation center C1 of the base plate 8 when viewed in the Z direction.

In the three brackets 9, internally threaded portions which are not illustrated are inscribed at positions corresponding to the bolt insertion holes 83. The three brackets 9 are fastened and fixed to the base plate 8 by bolts 75 inserted into the bolt insertion holes 83 from the top surface 8a side of the base plate 8.

End faces on the reduction portions 14 side of the three lower reduction-gear motors 10 are attached to the same side faces of the three brackets 9 which are fixed to the base plate 8 in this way. Accordingly, the lower reduction-gear motors 10 are disposed such that an output shaft 14a thereof is parallel to the XY plane (the horizontal direction), that is, the in-plane direction of the base plate 8.

The output shaft 14a of each lower reduction-gear motor 10 disposed in this way protrudes from a surface opposite to the attachment surface via a through-hole which is not illustrated and which is formed in the corresponding bracket 9.

(Link Mechanism)

A link mechanism 11 is attached to the output shaft 14a of the lower reduction-gear motor 10 protruding from each bracket 9. Since the link mechanisms 11 have the same configuration, only one link mechanism 11 will be described in the following description, and the remaining two link mechanisms 11 will be referenced by the same reference signs and description thereof will not be repeated.

The link mechanism 11 includes a first arm 15 of which a base end 15a is connected to the output shaft 14a, a second arm 16 that is disposed on a tip 15b side of the first arm 15, and a first connecting portion 17 that connects the tip 15b of the first arm 15 and a base end 16a of the second arm 16.

As illustrated in detail in FIG. 4, the first arm 15 is formed of a plate-shaped member. A through-hole 19 through which a tip (a diameter-decreased portion) of the output shaft 14a of the lower reduction-gear motor 10 can be inserted is formed on the base end 15a side of the first arm 15. In a state in which the base end 15a of the first arm 15 is inserted into the through-hole 19, the first arm 15 is fastened and fixed to the output shaft 14a using a bolt 21. Accordingly, three first arms 15 are arranged radially about the rotation center C1 and are arranged at equal intervals in the circumferential direction.

As illustrated in FIGS. 1, 2, and 4, the second arm 16 that is connected to the first arm 15 via the first connecting portion 17 includes two arm bars 26 that are disposed on opposite side faces 15c and 15d of the first arm 15. Base ends 26a of the arm bars 26 serve as a base end 16a of the second arm 16.

As illustrated in detail in FIG. 4, the first connecting portion 17 includes, as a main configuration, a through-hole 27 that is formed to penetrate a tip 15b of the first arm 15 in the thickness direction, a connecting shaft 28 that is inserted through the through-hole 27, and two sub connecting portions 29 that are respectively disposed at the base ends 26a of the arm bars 26 and are connected to the connecting shaft 28.

Each sub connecting portion 29 includes a rolling bearing 31 that rotatably supports the connecting shaft 28, a substantially ring-shaped bearing holder 32 to which the rolling bearing 31 is internally fitted, and a support portion 33 that connects the bearing holder 32 and the base ends 26a of the arm bars 26 to be rotatable.

An outer circumferential surface of the bearing holder 32 has a square shape when viewed in an axial direction of the connecting shaft 28. On the other hand, the support portion 33 has a substantially U-shape. That is, the support portion 33 includes a base 35 that is connected to the base 26a of each arm bar 26 and two hook portions 36 that extend from both sides of the base 35 to the bearing holder 32 side, which are integrally molded. The hook portions 36 are disposed on two opposite side faces of the bearing holder 32. That is, the bearing holder 32 is pinched by the two hook portions 36.

Shaft portions 37 are formed to protrude from side faces of the bearing holder 32 corresponding to the two hook portions 36. Two shaft portions 37 formed in one bearing holder 32 are arranged coaxially. The two shaft portions 37 are disposed to be perpendicular to the connecting shaft 28.

On the other hand, shaft holes 38 through which the shaft portions 37 can be inserted are formed in the two hook portions 36 of the support portion 33. Accordingly, the support portion 33 is connected to the bearing holder 32 to be rotatable about the shaft portions 37 perpendicular to the connecting shaft 28.

As illustrated in FIGS. 1 and 2, a movable plate 12 is rotatably connected to the tip 16b of the second arm 16, that is, the tips 26b of the arm bars 26, via a second connecting portion 18. The movable plate 12 is formed in a trifurcate shape. The movable plate 12 includes a plate body 42 and three protruding portions 46 that are integrally molded into an outer circumferential portion of the plate body 42 at equal intervals in a circumferential direction. The lower ends of the link mechanisms 11 (the tips 16b of the second arms 16) are connected to the three protruding portions 46 via the second connecting portions 18.

The second connecting portion 18 has the same basic configuration as the first connecting portion 17. Accordingly, the same elements of the second connecting portion 18 as in the first connecting portion 17 will be referenced by the same reference signs and description thereof will not be repeated.

A parallel mechanism is constituted by connecting the movable plate 12 to the base plate 8 via the three link mechanisms 11 in this way. When the three link mechanisms 11 are driven, the movable plate 12 moves in three-dimensional direction (XYZ directions) without changing its posture (in a state in which the movable plate is maintained in the horizontal direction).

In the plate body 42 of the movable plate 12, a rotary portion 44 is attached to most of the central portion to be rotatable with an axis in the thickness direction of the plate body 42. The rotary portion 44 is connected to the lower end 57a of the rotary arm 57 via a joint portion 100. A hand arm which is not illustrated can be attached to the lower end of the rotary portion 44, and a workpiece which is not illustrated is grasped by the hand arm.

On the bottom surface 8b of the base plate 8, a camera 70 that is used to detect a workpiece which is not illustrated is attached between two protruding portions 81a and 81c among the three protruding portions 81a, 81b, and 81c with a bracket 71 interposed therebetween. The bracket 71 includes a horizontal bracket 72 that protrudes from the bottom surface 8b of the base plate 8 to the other side 8d in the Y direction and a vertical bracket 73 that is disposed to rise vertically from the tip of the horizontal bracket 72. The camera 70 is attached to the lower end of the vertical bracket 73 to face downward.

(Operation of Parallel Robot)

With this configuration, first, a workpiece which is a component of a product is imaged by the camera 70 of the parallel robot 1 when the parallel robot 1 operates to assemble the product. Accordingly, a position and a direction of the workpiece are detected and the detection results are output as a signal to a control unit which is not illustrated.

The control unit which is not illustrated controls driving of the parallel robot 1 on the basis of the signal of the detection results from the camera 70. Specifically, driving of the lower reduction-gear motors 10 is controlled such that the movable plate 12 moves to a desired position. Thereafter, driving of the rotation-driving motor 50 is controlled such that the hand arm which is not illustrated and which is attached to the movable plate 12 is changed to a desired direction and the workpiece is grasped by the hand arm.

After the workpiece is grasped by the hand arm which is not illustrated, the parallel robot 1 moves along the slide rail which is not illustrated and the workpiece is transported to a next process. That is, the workpiece is transported to a position corresponding to a parallel robot 1 located downstream in a production line. The parallel robot 1 located downstream detects the workpieces transported from upstream by the camera 70. Then, the same operation as the above-mentioned parallel robot 1 is performed. A product can be assembled by repeatedly performing theses operations.

(Advantageous Effects)

The transmission mechanism 80 that transmits a rotational force of the rotation-driving motor 50 to the rotation-driving mechanism 51 is provided on the bottom surface 8b of the base plate 8 of the parallel robot 1. Accordingly, it is possible to decrease a distance from the transmission mechanism 80 to the workpiece. As a result, it is possible to set the length of the rotation-driving mechanism 51 (the linear motion guide 56 or the rotary arm 57) to be smaller. Accordingly, it is possible to reduce a stress which is applied to a position at which the rotation-driving mechanism is supported, that is, the joint portion 100 and to decrease a size of the parallel robot 1 as a whole.

Since the transmission mechanism 80 and the rotation-driving mechanism 51 are arranged on the bottom surface 8b side of the base plate 8, it is possible to reduce the number of components which are arranged on the top surface 8a of the base plate 8. Accordingly, it is possible to minimize a protruding height of components from the top surface 8a of the base plate 8 and thus to set a size in the height direction of the parallel robot 1 to be smaller.

The lower reduction-gear motors 10 that drive the link mechanisms 11 are arranged on the bottom surface 8b of the base plate 8. Accordingly, it is possible to reduce the number of components which are arranged on the top surface 8a of the base plate 8 and to secure a large empty space on the top surface 8*a*. As a result, for example, a support member (for example, the slider which is not illustrated) on which the parallel robot 1 is provided can be easily attached to the top surface 8*a* of the base plate 8. By effectively utilizing the empty space, it is possible to save a space in which the parallel robot 1 is provided.

The second through-hole 85 is formed in the base plate 8, and the rotation-driving motor 50 disposed on the top surface 8*a* of the base plate 8 and the transmission mechanism 80 (the spur gear 87) disposed on the bottom surface 8*b* of the base plate 8 are connected via the second through-hole 85. Accordingly, it is possible to easily perform transmission of driving between the rotation-driving motor 50 and the transmission mechanism 80 which are disposed on both sides of the base plate 8 in a space-saving manner. Since it is not necessary to raise the rotation-driving motor 50 from the top surface 8*a* of the base plate 8 as in the related art, it is possible to set a size in the height direction of the parallel robot 1 to be smaller.

The motor portion 52 of the rotation-driving motor 50 and the spur gear 87 of the reduction portion 53 are arranged to partially overlap each other in the thickness direction (the Z direction) of the base plate 8. Accordingly, it is possible to set an inter-axis distance between the rotary shaft 52*a* of the motor portion 52 and the spur gear 87 to be smaller. Accordingly, it is possible to save a space when disposing the rotation-driving motor 50 and the reduction portion 53 and to decrease a size of the robot apparatus.

The joint portions 100 that connect the rotation-driving mechanism 51, the shaft 88, and the movable plate 12 each is constituted by a pair of connecting portions 101*a* and 101*b*, the intermediate piece 110, the position regulating pin 108 that connects the connecting portions 101*a* and 101*b* to the intermediate piece 110 to be relatively rotatable, the rolling bearings 104 and 105 that rotatably support the position regulating pin 108, and the spacers 111 that are disposed between the extensions 103 of the connecting portions 101*a* and 101*b* and the intermediate piece 110. Accordingly, it is possible to set the movable range of the rotation-driving mechanism 51 and the shaft 88 to be as large as possible and thus to provide a parallel robot 1 with a small size that can transport a workpiece over a broad area.

By inscribing the internally threaded portion 110*b* in the intermediate piece 110 and forming the externally threaded portion 108*c* in the position regulating pin 108, the intermediate piece 110 and the position regulating pin 108 are fixed by fastening. Accordingly, it is possible to provide a parallel robot 1 in which the position regulating pin 108 can be easily replaced and which has excellent maintainability.

The invention is not limited to the above-mentioned embodiment, and includes various modifications of the embodiment without departing from the gist of the invention.

For example, in the above-mentioned embodiment, the reduction portion 53 includes only the spur gear 87 as a constituent gear. However, the invention is not limited thereto, but the reduction portion 53 may include a plurality of gears.

In the above-mentioned embodiment, two tongue piece portions 122*a* and 122*b* are formed in the fixing portion 121 of the joint portion 100, the internally threaded portion (not illustrated) is inscribed on the tip of the one tongue piece portion 122*a*, and the bolt insertion hole (not illustrated) is formed in the other tongue piece portion 122*b*. The first connecting portion 101*a* of the joint portion 100 is fixed to the lower end 88*a* of the shaft 88 using the bolts 124. However, the invention is not limited thereto, but bolt insertion holes may be formed in both of the two tongue piece portions 122*a* and 122*b*, the bolts 124 may be inserted through the bolt insertion holes, and nuts may be screwed to the tips of the bolts 124 to fasten the two tongue piece portions 122*a* and 122*b*.

Instead of employing the slit-fastening fixing structure for the fixing portion 121, the fixing portion 121 may be fixed to the lower end 88*a* of the shaft 88.

In the above-mentioned embodiment, two rolling bearings 104 and 105 are disposed on the extensions 103 of the joint portion 100, the internally threaded portion 110*b* is inscribed in the intermediate piece 110, and the connecting portions 101*a* and 101*b* and the intermediate piece 110 are connected to be relatively rotatable by the position regulating pin 108. However, the invention is not limited thereto, but an internally threaded portion 110*b* may be inscribed in the extensions 103 and two rolling bearings 104 and 105 may be provided in the intermediate piece 110. In this case, the flange portion 108*b* is not formed in the position regulating pin 108 and the position regulating pin 108 is fastened and fixed to the extensions 103 from the inside of the extensions 103.

Two rolling bearings 104 and 105 as a set may not be provided in one of the extensions 103 and the intermediate piece 110, but only one of the two rolling bearings 104 and 105 may be provided.

A structure in which the position regulating pin 108 is fastened and fixed to one of the extensions 103 and the intermediate piece 110 may not be employed. The position regulating pin 108 has only to be able to be fixed to one of the extensions 103 and the intermediate piece 110. For example, the position regulating pin 108 may be fixed to one of the extensions 103 and the intermediate piece 110 by press fitting.

INDUSTRIAL APPLICABILITY

In the robot apparatus and the parallel robot, by arranging the transmission mechanism and the rotation-driving mechanism on the same surface (one surface) of the base portion, it is possible to reduce the number of components which are disposed on the other surface of the base portion. Accordingly, it is possible to minimize a protruding height of components toward the other surface of the base portion and thus to set a size in the height direction of the robot apparatus to be smaller.

By arranging the transmission mechanism and the rotation-driving mechanism on the same surface (one surface) of the base portion, it is possible to reduce a distance from the transmission mechanism to a workpiece, that is, a distance from the transmission mechanism to an end of the rotation-driving mechanism opposite to the base portion. Accordingly, it is possible to set the length of the rotation-driving mechanism to be smaller. As a result, it is possible to reduce a stress which is applied to a position at which the rotation-driving mechanism is supported, that is, a base of the rotation-driving mechanism or a position at which the rotation-driving mechanism is connected to another component (for example, the movable portion). Accordingly, it is possible to decrease a size of components and to decrease a size of the robot apparatus as a whole.

What is claimed is:
1. A robot apparatus comprising:
a base portion;
a motor portion that is disposed on the base portion;

a transmission mechanism that is disposed on one surface of the base portion and to which a rotational force of the motor portion is transmitted; and a rotation-driving mechanism that is disposed on the one surface of the base portion and to which the rotational force of the motor portion is input via the transmission mechanism, wherein a workpiece is rotated by the rotation-driving mechanism at an end of the rotation-driving mechanism opposite to the base portion, and wherein a universal joint portion that connects the rotation-driving mechanism to a connecting target object is provided at at least one end of both ends of the rotation-driving mechanism, wherein the universal joint portion comprises:
 a pair of connecting portions of which one is attached to an end of the rotation-driving mechanism and of which the other is attached to the connecting target object;
 an intermediate portion that is disposed between the pair of connecting portions;
 a position regulating pin that connects the pair of connecting portions to the intermediate portion;
 a rolling bearing that is disposed in the connecting portion and rotatably supports the position regulating pin; and
 a spacer that is disposed around the position regulating pin, is disposed between the rolling bearing and the intermediate portion, and comes in contact with an inner ring of the rolling bearing, wherein each of the pair of connecting portions comprises:
 a base that extends in a direction intersecting an extending direction of the rotation-driving mechanism; and
 a pair of extensions that extends in a direction in which the extensions face each other from both ends of the base, wherein the bases are separately attached to the rotation-driving mechanism and the connecting target object, wherein the position regulating pin comprises:
 a pin body that is inserted into the rolling bearing;
 a flange portion that is disposed at one end of the pin body and comes in contact with the inner ring of the rolling bearing; and
 an externally threaded portion that is disposed at the other end of the pin body, and wherein an internally threaded portion is disposed in the intermediate portion, the externally threaded portion of the position regulating pin is fastened into the internally threaded portion of the intermediate portion.

2. The robot apparatus according to claim 1, wherein the motor portion is disposed on the other surface of the base portion,
 wherein a through-hole through which a rotary shaft of the motor portion is inserted is formed in the base portion, and
 wherein the rotary shaft and the transmission mechanism are connected via the through-hole.

3. The robot apparatus according to claim 2, wherein the transmission mechanism comprises:
 a sub gear that is disposed on the rotary shaft of the motor portion; and
 a reduction portion that comprises at least one gear to which rotation of the sub gear is transmitted and which reduces the rotation of the sub gear and outputs the reduced rotation, and
 wherein the reduction portion and the motor portion are arranged such that a part of the reduction portion and a part of the motor portion overlap each other a thickness direction of the base portion.

4. The robot apparatus according to claim 1, wherein the spacer is a member that is separate from the position regulating pin, the connecting portion, and the intermediate portion.

5. A parallel robot comprising:
 the robot apparatus according to claim 1;
 three link mechanisms that are disposed on the other one surface of the base portion; and
 a movable portion that is disposed at tips of the three link mechanisms and are rotatably connected to the three tips,
 wherein the rotation-driving mechanism is disposed to be suspended between the base portion and the movable portion.

6. The parallel robot according to claim 5, further comprising three driving portions that are disposed on the one surface of the base portion and are separately connected to base ends of the three link mechanisms.

7. A parallel robot comprising:
 the robot apparatus according to claim 2;
 three link mechanisms that are disposed on the one surface of the base portion; and
 a movable portion that is disposed at tips of the three link mechanisms and are rotatably connected to the three tips,
 wherein the rotation-driving mechanism is disposed to be suspended between the base portion and the movable portion.

* * * * *